(12) United States Patent
Chou et al.

(10) Patent No.: US 8,500,830 B2
(45) Date of Patent: Aug. 6, 2013

(54) HYDROGEN GENERATING APPARATUS AND FUEL CELL USING THE SAME

(75) Inventors: Po-Kuei Chou, Hsinchu County (TW); Cheng Wang, Hsinchu County (TW); Yueh-Chang Wu, Hsinchu County (TW)

(73) Assignee: Young Green Energy Co., Hsinchu County (TW)

(*) Notice: Subject to any disclaimer, the term of this patent is extended or adjusted under 35 U.S.C. 154(b) by 526 days.

(21) Appl. No.: 12/871,924

(22) Filed: Aug. 31, 2010

(65) Prior Publication Data
US 2011/0189558 A1     Aug. 4, 2011

(30) Foreign Application Priority Data
Jan. 29, 2010   (CN) .......................... 2010 1 0106989

(51) Int. Cl.
*B01J 7/00*     (2006.01)
(52) U.S. Cl.
USPC ............ 48/61; 48/197 R; 48/127.9; 48/127.1; 423/657; 423/648.1; 423/650; 423/651; 429/408; 429/416

(58) Field of Classification Search
USPC ............ 48/61, 127.9, 127.1; 423/657, 648.1, 423/650, 651; 429/408, 416
See application file for complete search history.

(56) References Cited

U.S. PATENT DOCUMENTS

| 6,128,904 | A | * | 10/2000 | Rosso et al. | .................... 60/649 |
| 6,939,529 | B2 | * | 9/2005 | Strizki et al. | ............... 423/658.2 |
| 7,316,719 | B2 | * | 1/2008 | Devos | ......................... 48/197 R |
| 7,655,056 | B2 | * | 2/2010 | Devos | ............................... 48/61 |
| 8,172,912 | B2 | * | 5/2012 | Marsh et al. | ...................... 48/61 |

* cited by examiner

*Primary Examiner* — Kaity V. Handal
(74) *Attorney, Agent, or Firm* — Jianq Chyun IP Office

(57) ABSTRACT

A hydrogen generating apparatus and a fuel cell using the same is provided. The hydrogen generating apparatus is adapted to a fuel cell, and includes a main body, an electromagnet, a magnetic element, a containing tank and a sliding element. The electromagnet is fixed on the main body. The magnetic element is movably disposed on the main body. The containing tank is fixed on the main body and is used for containing liquid water. The sliding element is slidably disposed on the main body, wherein a solid fuel is fixed on the sliding element. When the electromagnet is electrified to generate magnetic force to drive a motion of the magnetic element, the magnetic element drives the sliding element to slide towards the containing tank, so that the solid fuel reacts with the liquid water in the containing tank to generate hydrogen.

12 Claims, 5 Drawing Sheets

HYDROGEN GENERATING APPARATUS AND FUEL CELL USING THE SAME

CROSS-REFERENCE TO RELATED APPLICATION

This application claims the priority benefit of China application serial no. 201010106989.6, filed on Jan. 29, 2010. The entirety of the above-mentioned patent application is hereby incorporated by reference herein and made a part of this specification.

BACKGROUND OF THE INVENTION

1. Field of the Invention

The invention relates to a hydrogen generating apparatus and a fuel cell using the same. More particularly, the invention relates to a hydrogen generating apparatus using a solid fuel, and a fuel cell using the hydrogen generating apparatus.

2. Description of Related Art

A fuel cell (FC) is a power generator in which chemical energy is directly converted into electrical power through electrochemical reaction. Compared to a conventional power generating method, the fuel cell has advantages of low pollution, low noise, high energy density and higher energy conversion rate, etc., which is a clean energy source with a prospective future, and may be applied in various domains such as mobile electronic products, home power generation systems, transportation tools, military equipments, space industry, and small-scale power generation systems etc.

Various fuel cells may have different application domains due to their different operation principles and different operation environments. Proton exchange membrane fuel cells (PEMFC) and direct methanol fuel cells (DMFC) are mainly used in mobile energy applications, which are all low-temperature activation type fuel cells using the proton exchange membrane to carry on the proton conduction mechanism. An operation principle of the PEMFC is that the hydrogen carries on an oxidation reaction at an anode catalyst layer to generate hydrogen ions (H+) and electrons (e−) (PEMFC principle), or the methanol and water carry on the oxidation reaction at the anode catalyst layer to generate hydrogen ions (H+), carbon dioxide ($CO_2$) and electrons (e−) (DMFC principle), wherein the hydrogen ions may be conducted to a cathode through the proton exchange membrane, and the electrons are first transmitted to a load through an external circuit to work, and then are transmitted to the cathode. Now, the oxygen provided to the cathode and the hydrogen ions and the electrons carry on a reduction reaction at a cathode catalyst layer to generate water. The hydrogen fuel required by the above anode may be obtained through a solid sodium borohydride ($NaBH_4$) hydrogen storage technology, by which water is added to the solid sodium borohydride for reaction, so as to generate the hydrogen.

The reaction between the solid sodium borohydride and the water is one-off reaction, namely, once the reaction is carried on, it is stopped only when the solid sodium borohydride or the water is used out. Therefore, how to achieve a stepwise reaction is a problem to be resolved.

SUMMARY OF THE INVENTION

The invention is directed to a hydrogen generating apparatus, in which reactions between a solid fuel and water may be carried on stepwise.

The invention is directed to a fuel cell having a hydrogen generating apparatus, in which reactions between a solid fuel and water may be carried on stepwise.

Additional aspects and advantages of the invention will be set forth in the description of the techniques disclosed in the invention.

To achieve one of or all aforementioned and other advantages, an embodiment of the invention provides a hydrogen generating apparatus adapted to a fuel cell. The hydrogen generating apparatus includes a main body, an electromagnet, a magnetic element, a containing tank and a sliding element. The electromagnet is fixed on the main body. The magnetic element is movably disposed on the main body. The containing tank is fixed on the main body and is used for containing liquid water. The sliding element is slidiably disposed on the main body, wherein a solid fuel is fixed on the sliding element. When the electromagnet is electrified to generate magnetic force to drive a motion of the magnetic element, the magnetic element drives the sliding element to slide towards the containing tank, so that the solid fuel reacts with the liquid water in the containing tank to generate hydrogen.

To achieve one of or all aforementioned and other advantages, an embodiment of the invention provides a fuel cell including a hydrogen generating apparatus, a cell stack and a guiding structure. The hydrogen generating apparatus includes a main body, an electromagnet, a magnetic element, a containing tank and a sliding element. The electromagnet is fixed on the main body. The magnetic element is movably disposed on the main body. The containing tank is fixed on the main body and is used for containing liquid water. The sliding element is slidiably disposed on the main body, wherein a solid fuel is fixed on the sliding element. When the electromagnet is electrified to generate magnetic force to drive a motion of the magnetic element, the magnetic element drives the sliding element to slide towards the containing tank, so that the solid fuel reacts with the liquid water in the containing tank to generate hydrogen. The guiding structure is connected between the hydrogen generating apparatus and the cell stack, and is capable of guiding the hydrogen generated through the reaction between the solid fuel and the liquid water to the cell stack.

According to the above descriptions, the embodiments of the invention have at least one of the following advantages. The magnetic element may be driven by the electromagnet to drive the sliding element to slide close to or apart from the containing tank containing the liquid water, so that the solid fuel fixed on the sliding element may react with the liquid water to generate the hydrogen or the reaction between the solid fuel and the liquid water may be stopped to achieve an effect of stepwise reaction.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2:
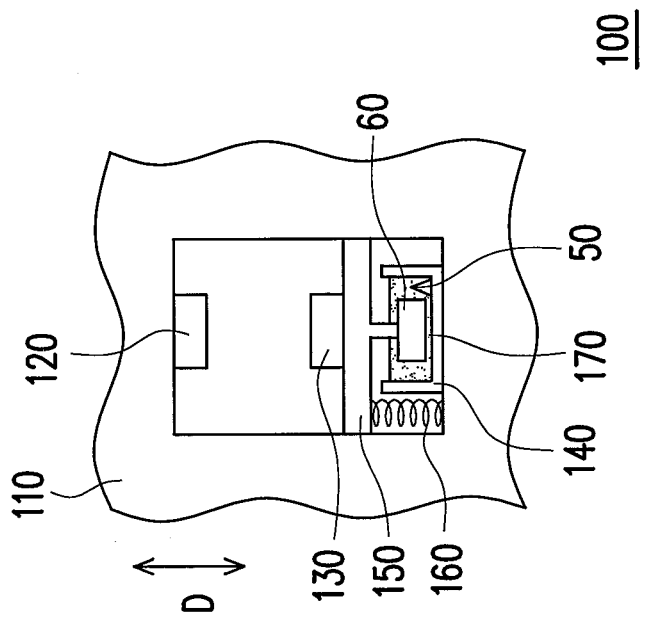
FIG. 2 is a schematic diagram illustrating a motion of a sliding element of FIG. 1.
Figure 1:
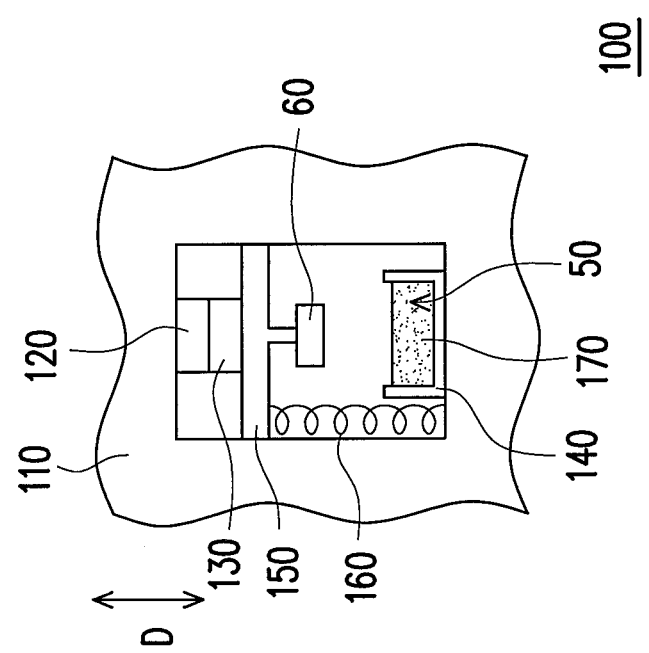
FIG. 1 is a schematic diagram illustrating a hydrogen generating apparatus according to an embodiment of the invention.

FIG. 1 is a schematic diagram illustrating a hydrogen generating apparatus according to an embodiment of the invention. FIG. 2 is a schematic diagram illustrating a motion of a sliding element of FIG. 1. Referring to FIG. 1 and FIG. 2, the hydrogen generation apparatus 100 of the embodiment is adapted to a fuel cell for providing hydrogen required by anode reaction of the fuel cell. The hydrogen generation apparatus 100 includes a main body 110, an electromagnet 120, a magnetic element 130, a containing tank 140 and a sliding element 150.

The electromagnet 120 is fixed on the main body 110. The sliding element 150 is slidiably disposed on the main body 110 along a direction D. The magnetic element 130 is fixed on the sliding element 150, and is capable of moving along with the sliding element 150 along the direction D relative to the main body 110. The containing tank 140 is fixed on the main body 110 and is used for containing liquid water 50. A solid fuel 60 is fixed on the sliding element 150. In this way, when the solid fuel 60 is required to react with the liquid water 50 to generate hydrogen, the electromagnet 120 is electrified to generate magnetism, so that a magnetic repulsion may drive the magnetic element 130 and the sliding element 150 to slide towards the containing tank 140 (as that shown in FIG. 2), and the solid fuel 60 reacts with the liquid water 50 in the containing tank 140 to generate hydrogen. In the embodiment, the magnetic element 130 is, for example, a permanent magnet.

When the reaction between the solid fuel 60 and the liquid water 50 in the containing tank 140 is required to be stopped, the electromagnet 120 is stopped electrifying to release the magnetic repulsion exerted on the magnetic element 130, so that the sliding element 150 is restored to its original position shown in FIG. 1, so as to achieve an effect of stepwise reaction. Wherein, the sliding element 150 is, for example, restored to the original position through an elastic force of an elastic element 160 connected between the main body 110 and the sliding element 150. In the embodiment, the elastic element is, for example, a spring, though the invention is not limited thereto, and other suitable elements having elasticity may also be used. In the other embodiments, in a space that the sliding element 150 slides in the main body 110 along the direction D, the main body 110 may further have a guiding device (not shown) disposed along the direction D, so that when the sliding element 150 slides in the main body 110 along the direction D, it may move along the guiding device in the direction D, so as to avoid a problem that the solid fuel 60 is failed to react with the liquid water 50 due to that the sliding element 150 moves along a direction deviated from the direction D.

Moreover, in the embodiment, the solid fuel 60 is, for example, solid sodium borohydride ($NaBH_4$), though the invention is not limited thereto, and other types of solid fuel may also be used.

Furthermore, the hydrogen generating apparatus 100 may further include a water absorbing structure 170. The water absorbing structure 170 is disposed in the containing tank 140, and is capable of absorbing the liquid water 50 to form hydro-gel, so as to fix the liquid water 50 within the containing tank 140 to avoid leakage of the liquid water 50.

Figure 3:
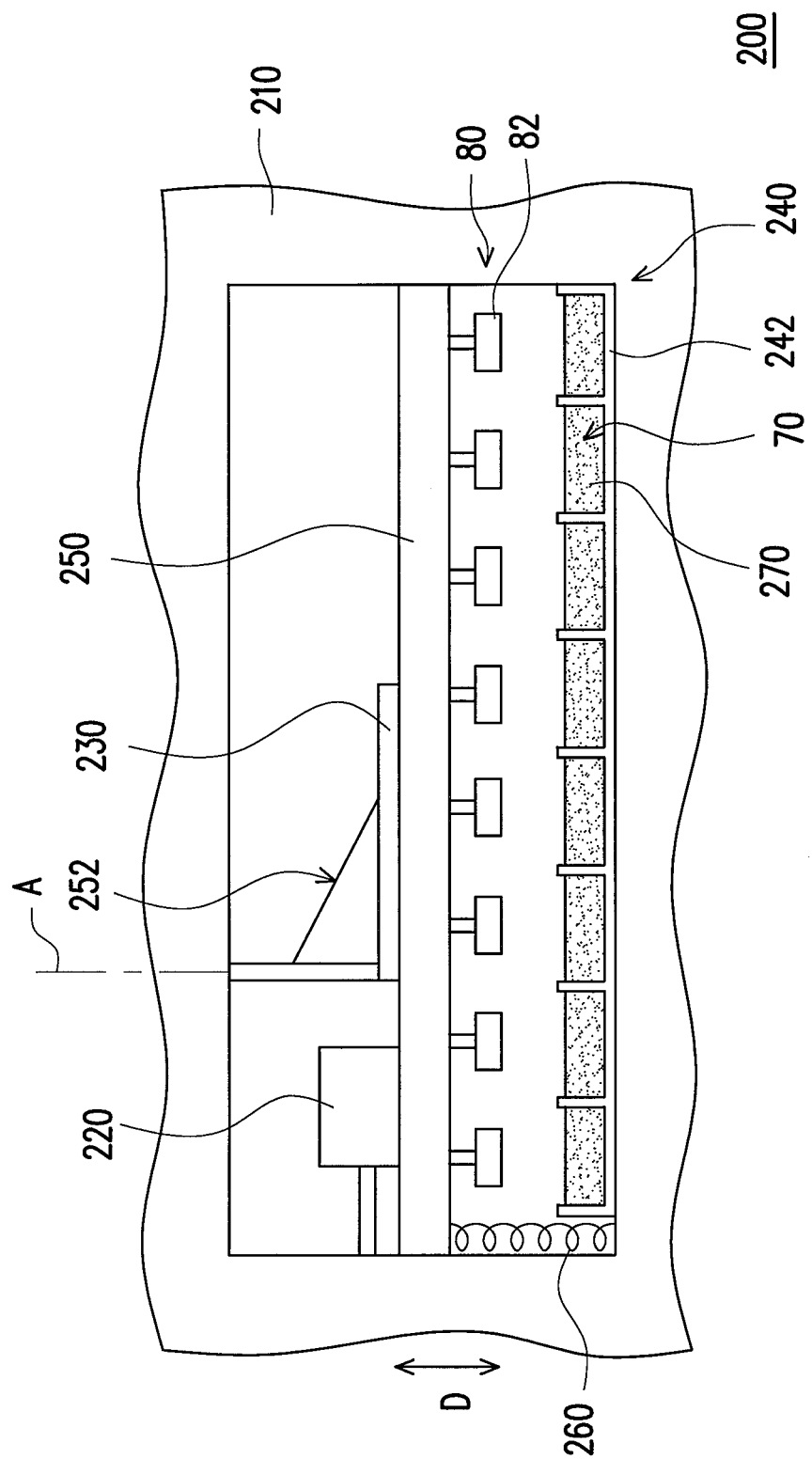
FIG. 3 is a schematic diagram illustrating a hydrogen generating apparatus according to another embodiment of the invention.
Figure 4:
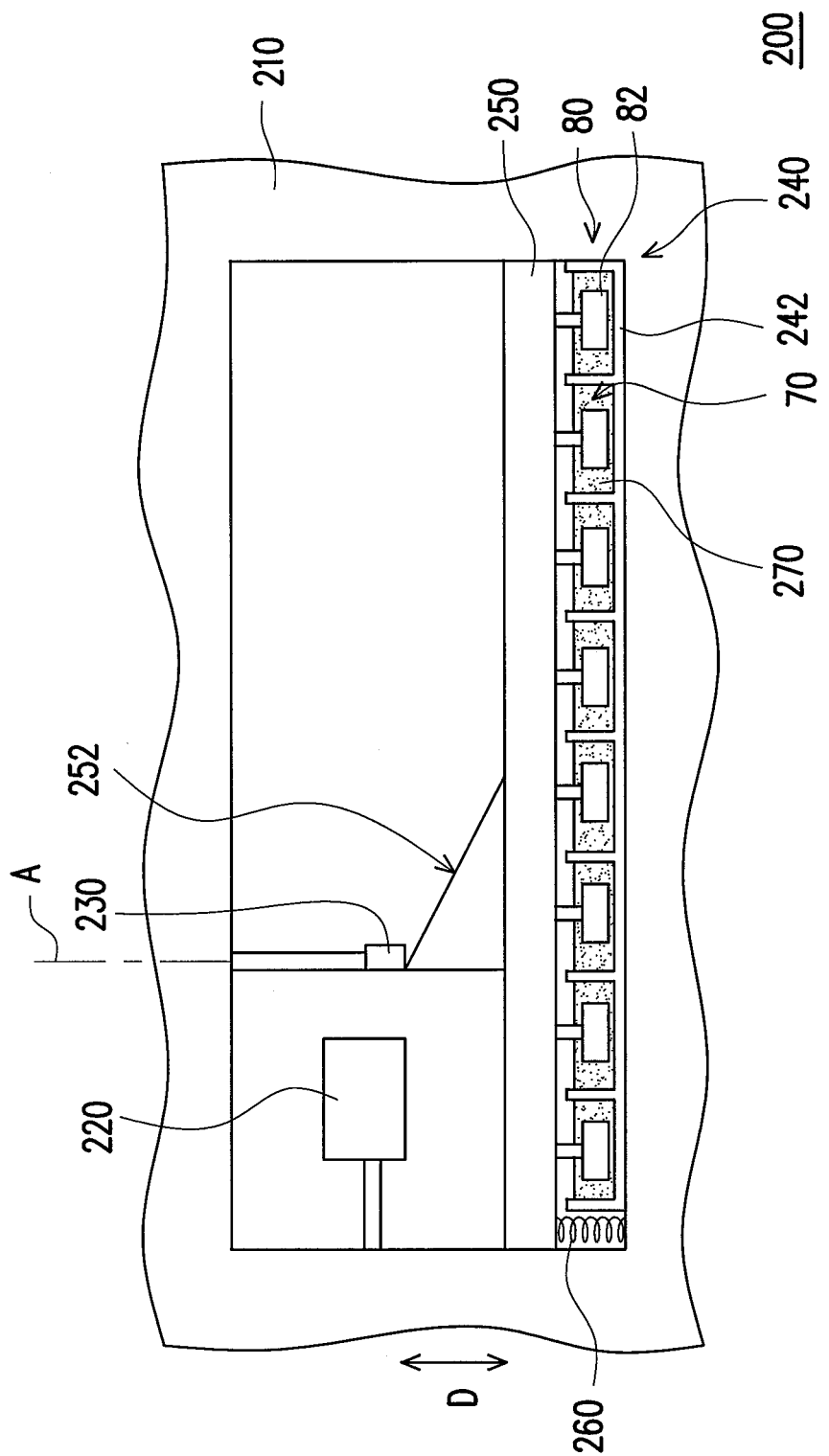
FIG. 4 is a schematic diagram illustrating a motion of a sliding element of FIG. 3.

FIG. 3 is a schematic diagram illustrating a hydrogen generating apparatus according to another embodiment of the invention. FIG. 4 is a schematic diagram illustrating a motion of a sliding element of FIG. 3. Referring to FIG. 3 and FIG. 4, the hydrogen generation apparatus 200 of the embodiment includes a main body 210, an electromagnet 220, a magnetic element 230, a containing tank 240 and a sliding element 250. The electromagnet 220 is fixed on the main body 210. The magnetic element 230 is pivotally connected to the main body 210. The containing tank 240 is fixed on the main body 210 and is capable of containing liquid water 70. The sliding element 250 is slidiably disposed on the main body 210 along a direction D, and has an inclined plane 252, wherein a solid fuel 80 is fixed on the sliding element 250.

In this way, when the solid fuel 80 is required to react with the liquid water 70 to generate hydrogen, the electromagnet 220 is electrified to generate magnetism, so that a magnetic attraction may drive a rotation of the magnetic element 230 to propel the inclined plane 252, so as to drive the sliding element 250 to slide towards the containing tank 240 (as that shown in FIG. 4), so that the solid fuel 80 reacts with the liquid water 70 in the containing tank 240 to generate hydrogen. In the embodiment, the magnetic element 230 is, for example, a permanent magnet.

When the reaction between the solid fuel 80 and the liquid water 70 in the containing tank 240 is required to be stopped, the electromagnet 220 is stopped electrifying to release the magnetic attraction exerted on the magnetic element 230, so that the sliding element 250 is restored to its original position shown in FIG. 3, so as to achieve the effect of stepwise reaction. Wherein, the sliding element 250 is, for example, restored to the original position through an elastic force of an elastic element 260 connected between the main body 210 and the sliding element 250.

Figure 6:
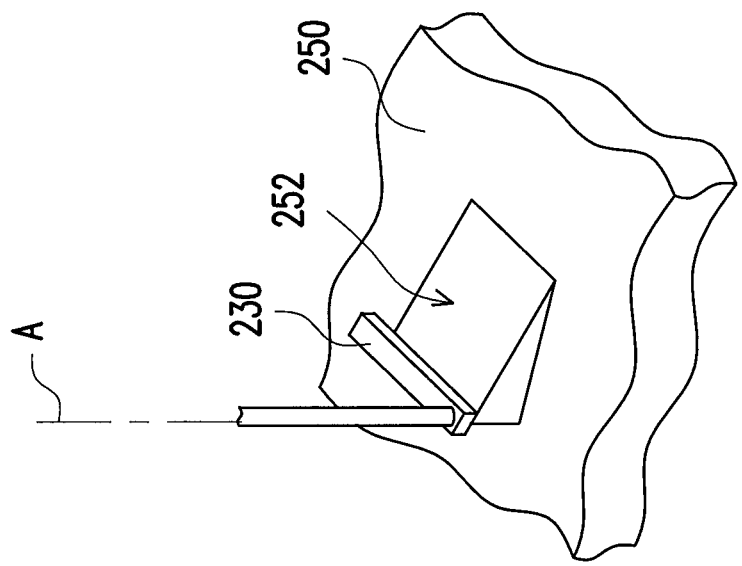
FIG. 6 is a three-dimensional view of a part of elements of a hydrogen generating apparatus of FIG. 4.
Figure 5:
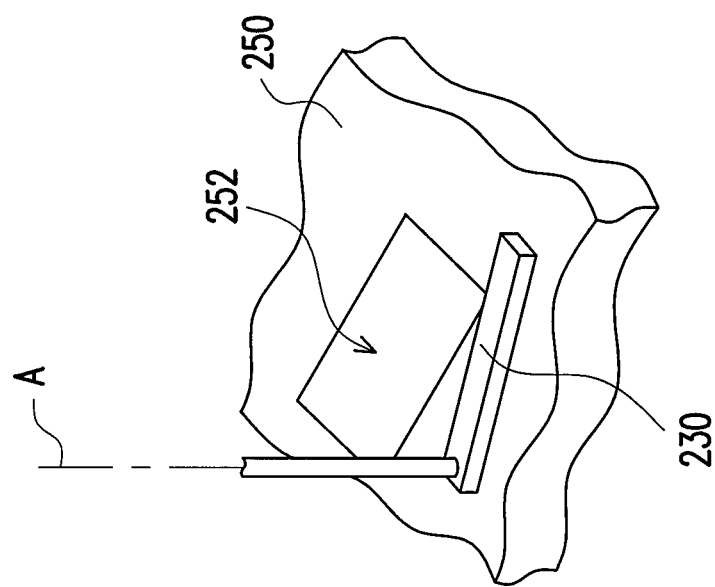
FIG. 5 is a three-dimensional view of a part of elements of a hydrogen generating apparatus of FIG. 3.

FIG. 5 is a three-dimensional view of a part of elements of the hydrogen generating apparatus of FIG. 3, and FIG. 6 is a three-dimensional view of a part of elements of the hydrogen generating apparatus of FIG. 4. Referring to FIG. 5 and FIG. 6, in detail, the magnetic element 230 is pivotally connected to the main body 210 along an axis A (shown in FIG. 3 and FIG. 4). The magnetic element 230 may be rotated from a state shown in FIG. 5 to a state shown in FIG. 6 along the axis A, so as to propel the inclined plane 252 to press the sliding element 250 downwards from a position shown in FIG. 5 to a position shown in FIG. 6.

Referring to FIG. 3 and FIG. 4, in the embodiment, the containing tank 240 is partitioned into a plurality of containing spaces 242 isolated from each other. The containing spaces 242 are used for containing the liquid water 70. The solid fuel 80 includes a plurality of fuel blocks 82 fixed to the sliding element 250. The fuel blocks 82 may move along with the sliding element 250 towards the containing spaces 242, so as to react with the liquid water 70 in the containing spaces 242 to generate hydrogen. By partitioning the solid fuel 80 into a plurality of the fuel blocks 82 to respectively react with the liquid water 70, a contact area between the solid fuel 80 and the liquid water 80 may be effectively increased to improve the reaction efficiency. In the other embodiments, the hydrogen generating apparatus 200 may have a plurality of electromagnets, a plurality of magnetic elements and a plurality of sliding elements, which are respectively correspond to one set of fuel blocks and containing spaces, and the reactions between the fuel blocks and the liquid water in the containing spaces may be carried on stepwise to generate the hydrogen, so as to further improve a utilization rate and the reaction efficiency of the hydrogen generating apparatus 200. Moreover, the hydrogen generating apparatus 200 may further include a water absorbing structure 270. The water absorbing structure 270 is disposed in the containing tank 240, and is capable of absorbing the liquid water 70 to form hydro-gel, so as to fix the liquid water 70 within the containing tank 240 to avoid leakage of the liquid water 70.

Figure 7:
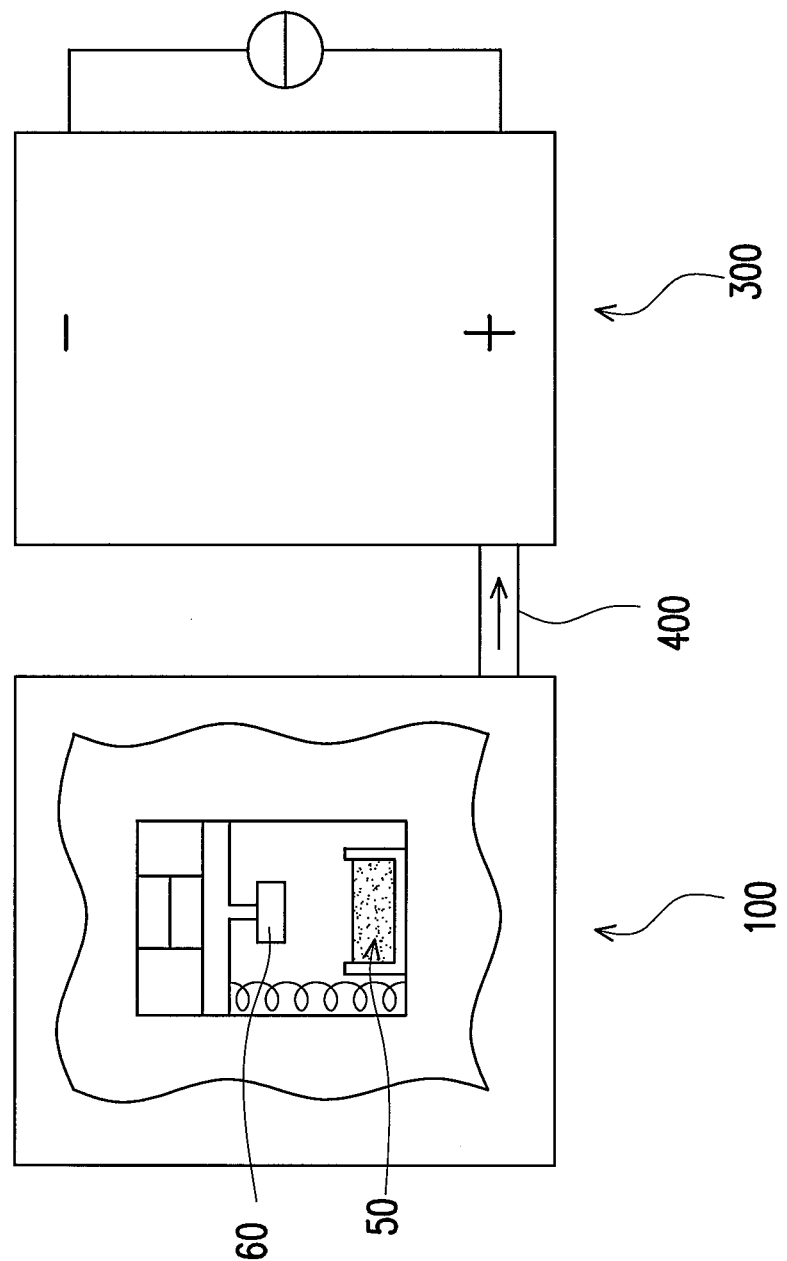
FIG. 7 is a schematic diagram illustrating a fuel cell applying a hydrogen generating apparatus of FIG. 1.

All of the aforementioned hydrogen generating apparatus may be applied to the fuel cell to provide the hydrogen required by the anode reaction of the fuel cell. The hydrogen generating apparatus 100 of FIG. 1 is taken as an example for description. FIG. 7 is a schematic diagram illustrating a fuel cell applying the hydrogen generating apparatus of FIG. 1. Referring to FIG. 7, the fuel cell 90 of the embodiment includes the hydrogen generating apparatus 100 of FIG. 1, a cell stack 300 and a guiding structure 400. The guiding structure 400 is connected between the hydrogen generating apparatus 100 and the cell stack 300, and is capable of guiding the hydrogen generated through the reaction between the solid fuel 60 and the liquid water 50 to the cell stack 300, so as to provide the hydrogen required by the anode reaction of the cell stack 300. It should be noticed that the oxygen required by cathode reaction of the cell stack 300 is, for example, provided by another supply source, which is not illustrated and described in the embodiment. The fuel cell 90 of the embodiment may be used in electronic devices such as notebook computers or mobile phones, etc., or may be used in transportation tools such as vehicles or ships, etc.

In summary, the embodiments of the invention have at least one of the following advantages. The magnetic element may be driven by the electromagnet to drive the sliding element to slide close to or apart from the containing tank containing the liquid water, so that the solid fuel fixed on the sliding element may react with the liquid water to generate the hydrogen or the reaction between the solid fuel and the liquid water may be stopped to achieve an effect of stepwise reaction. Moreover, the containing tank may be partitioned into a plurality of containing spaces respectively containing the liquid water, and the solid fuel may be partitioned into a plurality of fuel clocks to respectively react with the liquid water in the containing spaces, so as to increase the reaction area to improve the reaction efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A hydrogen generating apparatus adapted to a fuel cell, the hydrogen generating apparatus comprising:
   a main body;
   an electromagnet fixed on the main body;
   a magnetic element movably disposed on the main body;
   a containing tank, fixed on the main body, for containing liquid water; and
   a sliding element slidably disposed on the main body, wherein a solid fuel is fixed on the sliding element, and when the electromagnet is electrified to generate magnetic force to drive a motion of the magnetic element, the magnetic element drives the sliding element to slide towards the containing tank, so that the solid fuel reacts with the liquid water in the containing tank to generate hydrogen.

2. The hydrogen generating apparatus as claimed in claim 1, wherein the magnetic element is pivotally connected to the main body along an axis, the sliding element has an inclined plane, and the magnetic element is capable of rotating relative to the main body to propel the inclined plane, so as to drive the sliding element to move along the axis.

3. The hydrogen generating apparatus as claimed in claim 1, wherein the magnetic element is fixed on the sliding element.

4. The hydrogen generating apparatus as claimed in claim 1, wherein the containing tank is partitioned into a plurality of containing spaces isolated from each other, the containing spaces are used for containing the liquid water, the solid fuel comprises a plurality of fuel blocks fixed to the sliding element, and the fuel blocks are capable of respectively moving along with the sliding element towards the containing spaces.

5. The hydrogen generating apparatus as claimed in claim 4, further comprising:
a plurality of water absorbing structures respectively disposed in the containing spaces and capable of absorbing the liquid water.

6. The hydrogen generating apparatus as claimed in claim 1, further comprising:
an elastic element connected between the main body and the sliding element and capable of providing an elastic force to drive the sliding element to depart from the containing tank.

7. A fuel cell, comprising:
a hydrogen generating apparatus, comprising:
a main body;
an electromagnet fixed on the main body;
a magnetic element movably disposed on the main body;
a containing tank, fixed on the main body, for containing liquid water; and
a sliding element slidably disposed on the main body, wherein a solid fuel is fixed on the sliding element, and when the electromagnet is electrified to generate magnetic force to drive a motion of the magnetic element, the magnetic element drives the sliding element to slide towards the containing tank, so that the solid fuel reacts with the liquid water in the containing tank to generate hydrogen;
a cell stack; and
a guiding structure connected between the hydrogen generating apparatus and the cell stack and capable of guiding the hydrogen generated through reaction between the solid fuel and the liquid water to the cell stack.

8. The fuel cell as claimed in claim 7, wherein the magnetic element is pivotally connected to the main body along an axis, the sliding element has an inclined plane, and the magnetic element is capable of rotating relative to the main body to propel the inclined plane, so as to drive the sliding element to move along the axis.

9. The fuel cell as claimed in claim 7, wherein the magnetic element is fixed on the sliding element.

10. The fuel cell as claimed in claim 7, wherein the containing tank is partitioned into a plurality of containing spaces isolated from each other, the containing spaces are used for containing the liquid water, the solid fuel comprises a plurality of fuel blocks fixed to the sliding element, and the fuel blocks are capable of respectively moving along with the sliding element towards the containing spaces.

11. The fuel cell as claimed in claim 10, further comprising:
a plurality of water absorbing structures respectively disposed in the containing spaces and capable of absorbing the liquid water.

12. The fuel cell as claimed in claim 7, further comprising:
an elastic element connected between the main body and the sliding element and capable of providing an elastic force to drive the sliding element to depart from the containing tank.

* * * * *